United States Patent
Han et al.

(10) Patent No.: US 9,368,784 B2
(45) Date of Patent: Jun. 14, 2016

(54) RECHARGEABLE BATTERY

(71) Applicant: Samsung SDI Co., Ltd., Yongin-si, Gyeonggi-do (KR)

(72) Inventors: Min-Yeol Han, Yongin-si (KR); Sang-Won Byun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 175 days.

(21) Appl. No.: 14/181,597

(22) Filed: Feb. 14, 2014

(65) Prior Publication Data

US 2015/0079430 A1   Mar. 19, 2015

(30) Foreign Application Priority Data

Sep. 16, 2013   (KR) .......................... 10-2013-0111290

(51) Int. Cl.
*H01M 2/34* (2006.01)

(52) U.S. Cl.
CPC ................ *H01M 2/345* (2013.01); *H01M 2/34* (2013.01); *H01M 2200/20* (2013.01)

(58) Field of Classification Search
CPC ........................... H01M 2/345; H01M 2200/20
See application file for complete search history.

(56) References Cited

U.S. PATENT DOCUMENTS

| | | | | |
|---|---|---|---|---|
| 6,143,440 A * | 11/2000 | Volz | .................... | H01M 2/1044 429/100 |
| 2006/0115713 A1 * | 6/2006 | Kim | .................... | H01M 2/1229 429/61 |
| 2006/0199046 A1 * | 9/2006 | Dewulf | ............... | H01M 2/1241 429/7 |
| 2008/0070067 A1 * | 3/2008 | Jang | ........................ | H01M 2/30 429/8 |
| 2011/0183193 A1 * | 7/2011 | Byun | .................. | H01M 2/0426 429/178 |
| 2012/0183823 A1 * | 7/2012 | Von Borck | .......... | H01M 2/1061 429/81 |
| 2012/0251852 A1 * | 10/2012 | Kim | ....................... | H01M 2/345 429/61 |
| 2012/0315515 A1 | 12/2012 | Guen | | |
| 2014/0038001 A1 * | 2/2014 | Cai | ........................ | H01M 2/043 429/53 |
| 2014/0205872 A1 * | 7/2014 | Cai | ........................ | H01M 2/345 429/61 |
| 2015/0104672 A1 * | 4/2015 | Cai | ........................ | H01M 2/345 429/7 |

FOREIGN PATENT DOCUMENTS

KR   10-2012-0136267 A   12/2012
KR   10-1244738 B1   3/2013

OTHER PUBLICATIONS

Korean Patent Abstracts No. 10-2012-0060724 A for Patent No. KR 10-1244738 B1, 2 pages.

* cited by examiner

*Primary Examiner* — Scott J Chmielecki
(74) *Attorney, Agent, or Firm* — Lewis Roca Rothgerber Christie LLP

(57) ABSTRACT

A rechargeable battery includes an electrode assembly; a case accommodating the electrode assembly therein; a cap plate configured to close and seal an opening of the case; first and second electrode terminals extending through the cap plate and electrically coupled to the electrode assembly; and an external short-circuiter configured to electrically isolate or short-circuit the cap plate and the first terminal from or to each other, the cap plate being electrically coupled to the second electrode terminal. The external short-circuiter includes a membrane configured to close and seal a short-circuit opening in the cap plate, a short-circuit tab electrically coupled to the first electrode terminal and located at a side of the membrane, and the short-circuit tab includes a short-circuit protrusion, the short-circuit protrusion being configured to be separated from or short-circuited to the membrane. The membrane and the short-circuit protrusion have substantially the same resistivity.

11 Claims, 6 Drawing Sheets

RECHARGEABLE BATTERY

CROSS-REFERENCE TO RELATED APPLICATION

This application claims priority to and the benefit of Korean Patent Application No. 10-2013-0111290 filed in the Korean Intellectual Property Office on Sep. 16, 2013, the entire contents of which are incorporated herein by reference.

BACKGROUND

1. Field

The present disclosure relates to a rechargeable battery including an external short-circuiter.

2. Description of the Related Art

A rechargeable battery is a battery that is designed to be repeatedly charged and discharged, unlike a primary battery. A low-capacity rechargeable battery is used in, for example, small portable electronic devices such as a mobile phone, a notebook computer, and a camcorder, and a large-capacity rechargeable battery is used, for example, as a power supply for driving a motor such as for a hybrid car.

The rechargeable battery includes an electrode assembly including a separator and a positive electrode and a negative electrode provided on opposite surfaces of the separator, a case for accommodating the electrode assembly therein, a cap plate for sealing an opening of the case, and a positive electrode terminal and a negative electrode terminal installed in and extending through the cap plate and coupled to (e.g., electrically connected to) the electrode assembly.

The rechargeable battery may positively electrify (e.g., positively bias) the cap plate and may include an external short-circuiter between the negative electrode terminal and the cap plate. When internal pressure of the rechargeable battery reaches a reference level (e.g., a predetermined level), the external short-circuiter may operate (e.g., may be operated). In other words, the external short-circuiter is configured to (e.g., serves to) discharge a current charged in the electrode assembly to the outside of the electrode assembly.

For example, the external short-circuiter may include a short-circuit tab coupled to (e.g., connected to) the negative electrode terminal and a membrane which maintains a state in which it is separated from the short-circuit tab, is coupled to the cap plate, and may be deformed (e.g., reversed or inverted) to come into contact with the short-circuit tab. The cap plate and the membrane may be coupled to the positive electrode terminal.

When rechargeable batteries are connected in parallel or overcharged, an external short-circuit may be generated, which may cause a malfunction of the membrane due to an overcurrent. For example, after the membrane and the short-circuit tab are short-circuited (e.g., come into contact with each other), excess heat may be generated in short-circuited portions thereof due to overcurrent. Accordingly, the short-circuit tab may melt or the membrane may be broken.

The above information disclosed in this Background section is only for enhancement of understanding of the background of the described technology and therefore it may contain information that does not form the prior art that is already known in this country to a person of ordinary skill in the art.

SUMMARY

The described technology has been made in an effort to provide a rechargeable battery that may prevent malfunctioning of a membrane caused by an overcurrent when an external short-circuiter is operated.

According to an example embodiment, a rechargeable battery includes: an electrode assembly; a case accommodating the electrode assembly therein; a cap plate configured to close and seal an opening of the case; a first electrode terminal and a second electrode terminal extending through the cap plate and electrically coupled to the electrode assembly; and an external short-circuiter configured to electrically isolate or short-circuit the cap plate and the first terminal from or to each other, the cap plate being electrically coupled to the second electrode terminal. The external short-circuiter includes a membrane configured to close and seal a short-circuit opening in the cap plate, a short-circuit tab electrically coupled to the first electrode terminal and located at a side of the membrane, and the short-circuit tab includes a short-circuit protrusion, the short-circuit protrusion being configured to be separated from or short-circuited to the membrane. The membrane and the short-circuit protrusion have substantially the same resistivity.

The first electrode terminal may be a negative electrode terminal, and the second electrode terminal may be a positive electrode terminal.

The short-circuit tab may include nickel or stainless steel. The membrane may include aluminum.

The short-circuit tab may have a first through-hole and a second through-hole which respectively correspond to the first terminal and the short-circuit opening, and may be on the cap plate via a first electrode insulator, and the short-circuit protrusion may protrude past opposite surfaces of the short-circuit tab though the second through-hole.

The short-circuit protrusion may include a first protrusion member and a second protrusion member at opposite sides of the second through-hole and coupled to each other through the second through-hole.

The first protrusion member and the second protrusion member may be welded to each other in the second through-hole.

The first protrusion member and the second protrusion member may be thread-connected to each other in the second through-hole.

The short-circuit protrusion may be a rivet, extends through the second through-hole, and is fixed on opposite sides of the short-circuit tab.

Resistivity of the short-circuit tab may be greater than that of the short-circuit protrusion.

The membrane may be configured to deform according to an internal pressure of the case.

The external short-circuiter may be configured to electrically isolate or short-circuit the cap plate according to an internal pressure of the case.

As such, according to one example embodiment, the membrane and the short-circuit protrusion of the external short-circuiter are formed to have substantially the same resistivity. Accordingly, it is possible to prevent an overcurrent flowing between the membrane and the short-circuit protrusion when a short-circuit occurs. In other words, when rechargeable batteries connected in parallel are overcharged and an external short-circuit is generated due to the overcharge, the overcurrent flowing between the membrane and the short-circuit protrusion is prevented, and relevant heat emission is reduced, thereby preventing the membrane from malfunctioning.

DETAILED DESCRIPTION

Figure 1:
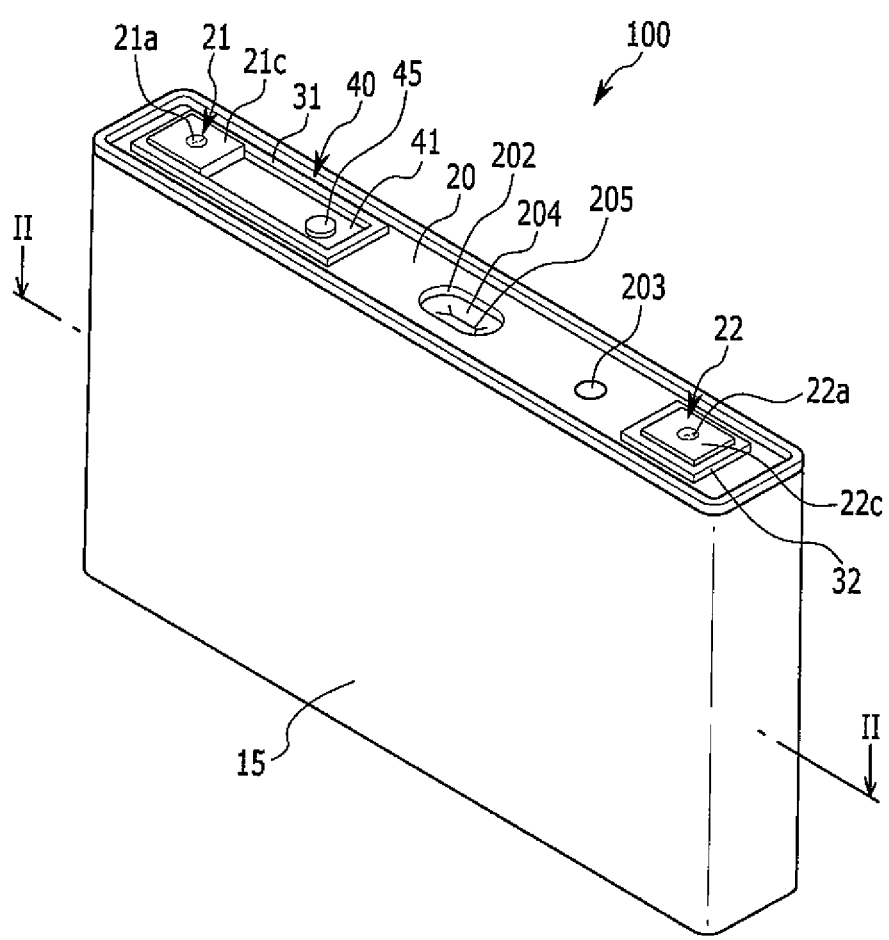
FIG. 1 is a perspective view showing a rechargeable battery in accordance with a first example embodiment of the present invention.

Hereinafter, example embodiments of the present invention will be described in detail with reference to the attached drawings such that the present invention can be easily put into practice by those skilled in the art. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

It will be understood that when an element or layer is referred to as being "on" or "connected to" another element or layer, it may be directly on or connected to the other element or layer or intervening elements or layers may also be present. When an element is referred to as being "directly on" or "directly connected to" another element or layer, there are no intervening elements or layers present. As used herein, the term "and/or" includes any and all combinations of one or more of the associated listed items. Further, the use of "may" when describing embodiments of the present invention refers to "one or more embodiments of the present invention."

Figure 2:
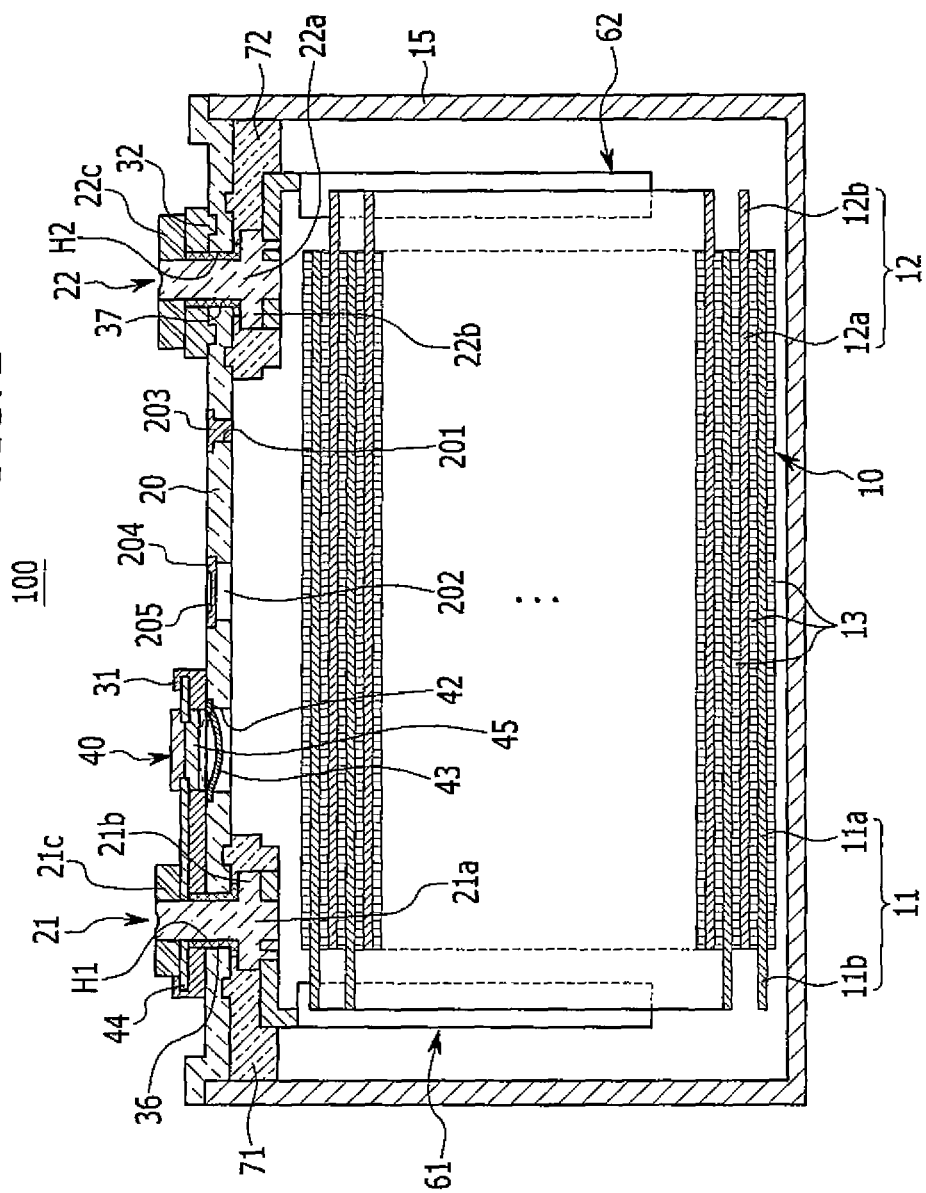
FIG. 2 is a cross-sectional view of the rechargeable battery taken along the line II-II of FIG. 1.

FIG. 1 is a perspective view showing a rechargeable battery in accordance with a first example embodiment of the present invention, and FIG. 2 is a cross-sectional view of the rechargeable battery taken along the line II-II of FIG. 1. Referring to FIG. 1 and FIG. 2, the rechargeable battery 100 of the first example embodiment includes an electrode assembly 10 for performing charging and discharging operations, a case 15 for accommodating the electrode assembly 10 therein, a cap plate 20 for closing and sealing an opening of the case 15, a negative electrode terminal 21 and a positive electrode terminal 22 respectively mounted in terminal openings H1 and H2 (e.g., terminal holes) of the cap plate 20 to be coupled to (e.g., connected to) the electrode assembly 10, and an external short-circuiter (e.g., an external short-circuit member) 40 for electrically connecting or electrically disconnecting the cap plate 20 and the negative electrode terminal 21 to or from each other. The cap plate 20 may be coupled to (e.g., electrically connected to) the positive electrode terminal 22.

The electrode assembly 10 is formed by disposing a negative electrode 11 and a positive electrode 12 on opposite surfaces of a separator 13 serving as an insulator, and winding the negative electrode 11, the separator 13, and the positive electrode 12 in, for example, a jelly-roll shape.

The negative and positive electrodes 11 and 12 respectively include coated regions 11a and 12a, formed by applying an active material to a current collector of a metal plate, and uncoated regions 11b and 12b which are exposed portions of the current collector to which the active material is not applied.

The uncoated region 11b of the negative electrode 11 is formed at one end of the negative electrode 11 along the wound negative electrode 11. The uncoated region 12b of the positive electrode 12 is formed at one end of the positive electrode 12 along the wound positive electrode 12. As a result, the uncoated regions 11b and 12b of the negative electrode 11 and the positive electrode 12 are respectively disposed at opposite ends of the electrode assembly 10.

For example, the case 15 may be configured to have a substantially cubic shape to form a space for receiving the electrode assembly 10 and an electrolyte solution and an opening connecting an inner space to the outside may be formed on one side of the cuboid. The opening enables the electrode assembly 10 to be inserted into the case 15.

The cap plate 20 may be formed of a thin plate and coupled to (e.g., welded to) the opening of the case 15 to close and seal the case 15. The cap plate 20 may include an electrolyte injection opening 201, a vent opening 202 (e.g., a vent hole), and a short-circuit opening 42 (e.g., a short-circuit hole).

After the cap plate 20 is coupled with (e.g., welded to) the case 15, the electrolyte solution may be injected into the case 15 through the electrolyte injection opening 201. After the electrolyte solution is injected, the electrolyte injection opening 201 may be sealed by a sealing cap 203.

The vent opening 202 is closed and sealed with a vent plate 204 so that internal pressure of the rechargeable battery 100 may be contained. If the internal pressure of the rechargeable battery 100 reaches a reference level (e.g., a predetermined level), the vent plate 204 may rupture to open the vent opening 202 to discharge the internal pressure of the rechargeable battery 100. A notch 205 for inducing the rupture is formed in the vent plate 204.

The negative and positive electrode terminals 21 and 22 are mounted in and extend through the cap plate 20 and are coupled to (e.g., electrically connected to) the electrode assembly 10. For example, the negative electrode terminal 21 is coupled to (e.g., electrically connected to) the negative electrode 11 of the electrode assembly 10, and the positive electrode terminal 22 is coupled to (e.g., electrically connected to) the positive electrode 12 of the electrode assembly 10. Accordingly, the electrode assembly 10 is electrically coupled outside the case 15 through the negative electrode terminal 21 and the positive electrode terminal 22.

The negative and positive electrode terminals 21 and 22 respectively include rivet terminals 21a and 22a mounted in the terminal openings H1 and H2 of the cap plate 20, flanges 21b and 22b integrally and widely formed in the rivet terminals 21a and 22a at an inner side of the cap plate 20, and plate terminals 21c and 22c coupled to (e.g., connected to) the rivet terminals 21a and 22a which are disposed at the outer side of the cap plate 20 by, for example, riveting or welding.

Negative and positive electrode gaskets 36 and 37 are respectively inserted between the rivet terminals 21a and 22a of the negative and positive electrode terminals 21 and 22 and the internal surfaces of the terminal openings H1 and H2 of the cap plate 20, to seal a gap between the rivet terminals 21a and 22a and the cap plate 20. The negative and positive electrode gaskets 36 and 37 may extend between the rivet terminals 21b and 22b and the internal surface of the cap plate 20 to further seal the gap between the rivet terminals 21a and 22a and the cap plate 20, respectively.

Negative and positive lead tabs 61 and 62 respectively couple (e.g., electrically connect) the negative and positive electrode terminals 21 and 22 to the negative and positive electrodes 11 and 12 of the electrode assembly 10. The negative and positive lead tabs 61 and 62 are respectively coupled to the lower ends of the rivet terminals 21a and 22a while being supported by the flanges 21b and 22b, and the lead tabs 61 and 62 coupled to the lower ends of the rivet terminals 21a and 22a to seal (e.g., caulk) the lower ends thereof.

Internal insulators 71 and 72 are respectively mounted between the negative and positive lead tabs 61 and 62 and the cap plate 20 to electrically insulate the negative and positive lead tabs 61 and 62 from the cap plate 20

In addition, one side of each of the internal insulators 71 and 72 is coupled to the cap plate 20, and the other side thereof surrounds the negative and positive lead tabs 61 and 62, the rivet terminals 21a and 22a, and the flanges 21b and 22b, thereby stabilizing a connection structure thereof.

The positive electrode gasket 37 is extended and inserted between the rivet terminal 22a of the positive electrode terminal 22 and a top plate 32 to prevent the rivet terminal 22a and the top plate 32 from being directly coupled (e.g., directly electrically connected) to each other. In other words, the rivet terminal 22a may be coupled to (e.g., electrically connected to) the top plate 32 through the plate terminal 22c. Accordingly, the top plate 32, the cap plate 20, and the case 15 are coupled to (e.g., electrically connected to) the positive electrode terminal 22 so as to be positively electrified (e.g., positively biased).

The negative electrode gasket 36 is extended and inserted between the rivet terminal 21a of the negative electrode terminal 21 and the external short-circuiter 40 (e.g., the negative electrode gasket 36 extended and inserted into an opening or a hole of a negative electrode insulator 31 which corresponds to the terminal opening H1). The external short-circuiter 40 is configured to maintain a disconnected state or to be short-circuited according to the internal pressure of the rechargeable battery 100.

For example, the external short-circuiter 40 includes a membrane 43 for closing and sealing the short-circuit opening 42 formed in the cap plate 20 and that is deformed (e.g., reversed or inverted) according to the internal pressure of the rechargeable battery 100, a short-circuit tab 44 coupled to (e.g., electrically connected to) the negative electrode terminal 21 and separately disposed at one side of the membrane 43, and a short-circuit protrusion 45 formed in the short-circuit tab 44 to be isolated from (e.g., disconnected from) or short-circuited to (e.g., contacting or connected to) the membrane 43.

The cap plate 20 is positively electrified (e.g., positively biased), and thus each of the short-circuit tab 44 of the external short-circuiter 40 and the rivet terminal 21a of the negative electrode terminal 21 is mounted on and electrically insulated from the cap plate 20 via the negative electrode insulator 31. The negative electrode insulator 31 has openings (e.g., holes) corresponding to the terminal opening H1 and the short-circuit opening 42 to avoid interference with the mounting of the rivet terminal 21a and the deforming (e.g., reversing or inverting) of the membrane 43.

Figure 3:
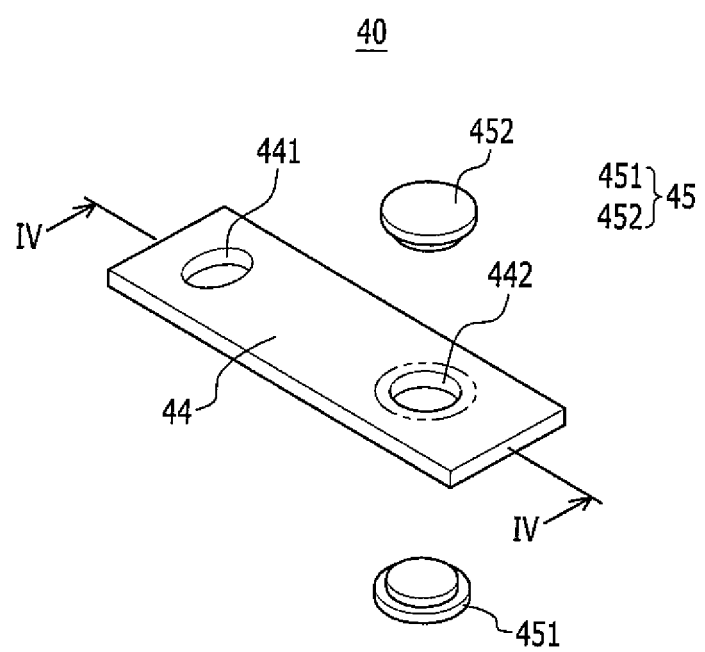
FIG. 3 is an exploded perspective view showing an external short-circuiter shown in FIG. 2.
Figure 4:
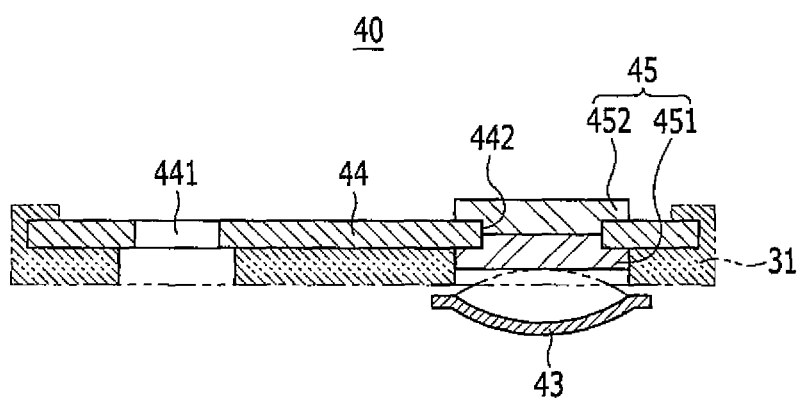
FIG. 4 is a cross-sectional view showing the external short-circuiter taken along the line IV-IV of FIG. 3.

FIG. 3 is an exploded perspective view showing the external short-circuiter shown in FIG. 2, and FIG. 4 is a cross-sectional view showing the external short-circuiter taken along the line IV-IV of FIG. 3. Referring to FIG. 3 and FIG. 4, the membrane 43 and the short-circuit protrusion 45 may have the same resistivity. Resistivity of the short-circuit tab 44 may be greater than that of the short-circuit protrusion 45.

For example, the short-circuit tab 44 may be made of nickel or stainless steel, and the membrane 43 may be made of aluminum. The short-circuit protrusion 45 may be made of aluminum similar to the membrane 43.

The short-circuit tab 44 has a first through-hole 441 and a second through-hole 442 which are respectively formed therein to correspond to the rivet terminal 21a of the negative terminal 21 and the short-circuit opening 42, and the short-circuit tab 44 is mounted on the cap plate 20 via the negative electrode insulator 31 formed with openings (e.g., holes) corresponding to the first and second through-holes 441 and 442.

The short-circuit protrusion 45 may be formed to protrude from the second through-hole 442 toward opposite surfaces of the short-circuit tab 44. For example, the short-circuit protrusion 45 may include a first protrusion member 451 and a second protrusion member 452 respectively disposed at opposite sides of the second through-hole 442 and coupled to (e.g., connected to) each other through the second through-hole 442.

For example, the first protrusion member 451 and the second protrusion member 452 protrude toward each other and contact each other in the second through-hole 442 and are coupled to (e.g., connected to and/or welded to) each other in the second through-hole 442. In this case, the second through-hole 442 facilitates resistance-welding between the first protrusion member 451 and the second protrusion member 452.

The short-circuit tab 44 is coupled to (e.g., electrically connected to) the short-circuit protrusion 45 (i.e., the first protrusion member 451 and the second protrusion member 452) by a strong fastening force caused by adhesion between the first protrusion member 451 and the second protrusion member 452.

The short-circuit tab 44 may be made of a different material from that of the short-circuit protrusion 45. The first protrusion member 451 and the second protrusion member 452 may be made of the same material, for example, aluminum, to be welded to each other through the second through-hole 442 of the short-circuit tab 44 regardless of a material type of the short-circuit tab 44 and smoothly mounted at or to the short-circuit tab 44.

When the rechargeable battery 100 is normally operated, the membrane 43 maintains a disconnected state from the short-circuit protrusion 45 of the short-circuit tab 44 as indicated by solid lines shown in FIG. 2 and FIG. 4.

When an internal pressure of the rechargeable battery 100 is increased above a normal state or level thereof, for example, when rechargeable batteries 100 connected in parallel are overcharged, or an external short-circuit is caused by the overcharge, the membrane 43 may be deformed (e.g., reversed or inverted) as indicated by imaginary lines shown in FIG. 2 and FIG. 4 to be short-circuited to (e.g. to contact) the short-circuit protrusion 45 of the short-circuit tab 44.

As a result, the positive electrode terminal 22, the cap plate 20, the short-circuit tab 44, the membrane 43, and the negative terminal 21 may be short-circuited to (e.g., electrically connected to) each other so that a current charged in the electrode assembly 10 may be discharged through the external short-circuiter 40.

Because the membrane 43 and the short-circuit protrusion 45 have substantially the same resistivity, an overcurrent may be reduced or prevented from flowing between the membrane 43 and the short-circuit protrusion 45 and relevant heat emission may be reduced. Therefore, after a short-circuit operation of the external short-circuiter 40, the membrane 43 can be prevented from malfunctioning.

Hereinafter, various example embodiments of the prevent invention will be described. The same configurations as in the first example embodiment and the described example embodiment will be omitted, and different configurations from the first example embodiment will now be described.

Figure 5:
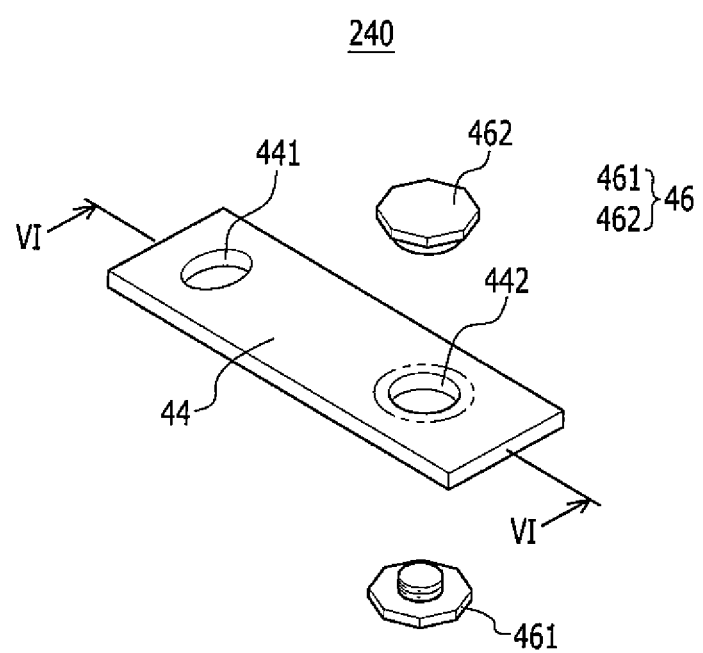
FIG. 5 is an exploded perspective view showing an external short-circuiter in accordance with a second example embodiment of the present invention.
Figure 6:
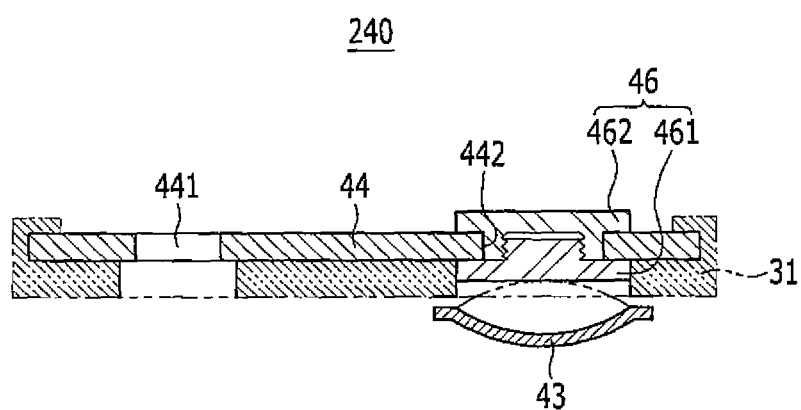
FIG. 6 is a cross-sectional view showing the external short-circuiter taken along the line VI-VI of FIG. 5.

FIG. 5 is an exploded perspective view showing an external short-circuiter 240 in accordance with a second example embodiment of the present invention, and FIG. 6 is a cross-sectional view showing the external short-circuiter taken along the line VI-VI of FIG. 5. Referring to FIG. 5 and FIG. 6, in the second example embodiment, a short-circuit protrusion 46 of the external short-circuiter 240 includes a first protrusion member 461 and a second protrusion member 462.

For example, the first protrusion member 461 and the second protrusion member 462 are respectively formed with a male thread and a female thread to protrude and to be coupled to (e.g., thread-connected to) each other at or in the second through-hole 442. Such a coupled structure (e.g., a thread-connection structure) makes it relatively easier to form the short-circuit protrusion 46 by mounting the first protrusion member 461 and the second protrusion member 462 in the short-circuit tab 44 as compared with the first example embodiment, which used, for example, a welding process.

Figure 7:
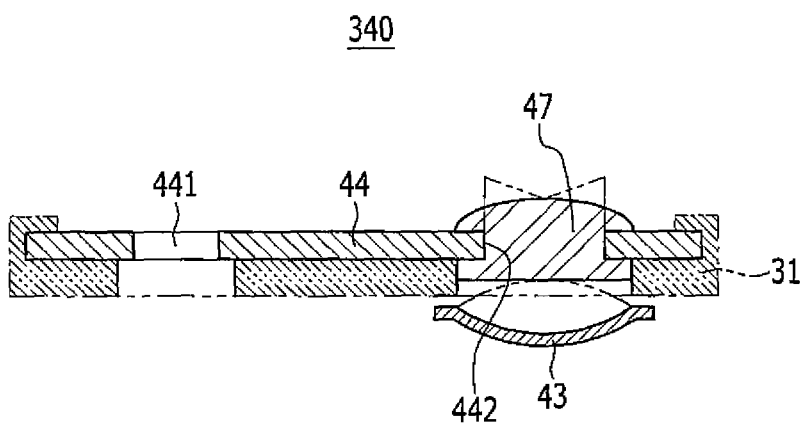
FIG. 7 is a cross-sectional view showing an external short-circuiter in accordance with a third example embodiment of the present invention.

FIG. 7 is a cross-sectional view showing an external short-circuiter 340 in accordance with a third example embodiment of the present invention. Referring to FIG. 7, in the third example embodiment, a short-circuit protrusion 47 of the external short-circuiter 340 may be formed as a rivet which extends through the second through-hole 442 to be fixed on opposite sides of the short-circuit tab 44.

The short-circuit protrusion 47 of the third example embodiment may reduce the number of parts as compared with the first or second example embodiment, each of which includes a short-circuit protrusion formed of two separate pieces.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims and their equivalents.

| Description of Reference Symbols | |
|---|---|
| 10: electrode assembly | 11: negative electrode |
| 11a, 12a: coated region | 11b, 12b: uncoated region |
| 12: positive electrode | 13: separator |
| 15: case | 20: cap plate |
| 21: negative terminal | 22: positive electrode terminal |
| 21a, 22a: rivet terminal | 21b, 22b: flange |
| 21c, 22c: plate terminal | 31: negative electrode insulator |
| 32: top plate | |
| 36, 37: negative, positive electrode gasket | |
| 40, 240, 340: external short-circuiter | 42: short-circuit opening or hole |
| 43: membrane | 44: short-circuit tab |
| 45, 46, 47: short-circuit protrusion | 46: top plate |
| 201: electrolyte injection opening | 202: vent opening or hole |
| 203: sealing cap | 204: vent plate |
| 205: notch | 441, 442: first, second through-hole |
| 451, 461: first protrusion member | 452, 462: second protrusion member |
| H1, H2: terminal opening or hole | |

What is claimed is:

1. A rechargeable battery comprising:
an electrode assembly;
a case accommodating the electrode assembly therein;
a cap plate configured to close and seal an opening of the case;
a first electrode terminal and a second electrode terminal extending through the cap plate and electrically coupled to the electrode assembly; and
an external short-circuiter configured to electrically isolate or short-circuit the cap plate and the first terminal from or to each other, the cap plate being electrically coupled to the second electrode terminal,
wherein the external short-circuiter comprises:
a membrane configured to close and seal a short-circuit opening in the cap plate; and
a short-circuit tab electrically coupled to the first electrode terminal and located at a side of the membrane, the short-circuit tab comprising a short-circuit protrusion coupled to the short-circuit tab, the short-circuit protrusion being configured to be separated from or short-circuited to the membrane,
wherein the membrane and the short-circuit protrusion have substantially the same resistivity,
wherein the short-circuit tab has a first through-hole and a second through-hole which respectively correspond to the first terminal and the short-circuit opening, and is on the cap plate via a first electrode insulator, and
wherein the short-circuit protrusion protrudes past opposite surfaces of the short-circuit tab through the second through-hole.

2. The rechargeable battery of claim 1, where in the first electrode terminal is a negative electrode terminal, and wherein the second electrode terminal is a positive electrode terminal.

3. The rechargeable battery of claim 1, wherein the short-circuit tab comprises nickel or stainless steel.

4. The rechargeable battery of claim 3, wherein the membrane comprises aluminum.

5. The rechargeable battery of claim 1, wherein the short-circuit protrusion comprises a first protrusion member and a second protrusion member at opposite sides of the second through-hole and coupled to each other at the second through-hole.

6. The rechargeable battery of claim 5, wherein the first protrusion member and the second protrusion member are welded to each other in the second through-hole.

7. The rechargeable battery of claim 5, wherein the first protrusion member and the second protrusion member are thread-connected to each other in the second through-hole.

8. The rechargeable battery of claim 1, wherein the short-circuit protrusion is a rivet, extends through the second through-hole, and is fixed on opposite sides of the short-circuit tab.

9. The rechargeable battery of claim 1, wherein resistivity of the short-circuit tab is greater than that of the short-circuit protrusion.

10. The rechargeable battery of claim 1, wherein the membrane is configured to deform according to an internal pressure of the case.

11. The rechargeable battery of claim 1, wherein the external short-circuiter is configured to electrically isolate or short-circuit the cap plate according to an internal pressure of the case.

* * * * *